US005618874A

United States Patent [19]

Jourbert et al.

[11] Patent Number: 5,618,874

[45] Date of Patent: *Apr. 8, 1997

[54] STABLE PUMPABLE ZEOLITE/SILICONATE SUSPENSIONS

[75] Inventors: Daniel Jourbert, Chantilly; Marc Malassis, Franconville, both of France

[73] Assignee: Rhone-Poulenc Chimie, Courbevoie Cedex, France

[ * ] Notice: The term of this patent shall not extend beyond the expiration date of Pat. No. 5,104,566.

[21] Appl. No.: 357,374

[22] Filed: Dec. 15, 1994

Related U.S. Application Data

[62] Division of Ser. No. 573, Jan. 4, 1993, Pat. No. 5,401,432, which is a continuation of Ser. No. 593,961, Oct. 9, 1990, abandoned.

[30] Foreign Application Priority Data

Oct. 9, 1989 [FR] France .................................. 89 13138

[51] Int. Cl.[6] .............................. C08K 3/34; C11D 3/08

[52] U.S. Cl. .......................... 524/450; 524/556; 510/532; 510/507

[58] Field of Search .................................... 524/450, 556; 252/174.15, 174.25

[56] References Cited

U.S. PATENT DOCUMENTS

| | | | |
|---|---|---|---|
| 2,441,422 | 5/1948 | Krieble et al. | 252/311 |
| 2,441,423 | 5/1948 | Elliott et al. | 252/311 |
| 4,072,622 | 2/1978 | Kühling et al. | 252/179 |
| 4,267,068 | 5/1981 | Diessel et al. | 252/179 |
| 4,421,657 | 12/1983 | Allen et al. | 252/8.6 |
| 4,454,056 | 6/1984 | Kittelmann et al. | 252/174.15 |
| 4,529,541 | 7/1985 | Wilms et al. | 252/526 |
| 4,534,880 | 8/1985 | Kosal et al. | 252/174.13 |
| 4,549,979 | 10/1985 | Chandra et al. | 252/135 |
| 4,581,153 | 4/1986 | Trabitzsch et al. | 252/140 |
| 4,692,264 | 9/1987 | Gresser | 252/140 |
| 4,741,862 | 5/1988 | Kosal | 252/527 |
| 5,064,562 | 11/1991 | Jost et al. | 252/174.15 |
| 5,104,566 | 4/1992 | Guerin et al. | 252/174.17 |

FOREIGN PATENT DOCUMENTS

| | | |
|---|---|---|
| 0177369 | 4/1986 | European Pat. Off. . |
| 0233689 | 1/1987 | European Pat. Off. . |
| 61-256915 | 5/1985 | Japan . |

*Primary Examiner*—Mark D. Sweet
*Attorney, Agent, or Firm*—Burns, Doane, Swecker & Mathis, L.L.P.

[57] ABSTRACT

Stable suspensions of zeolite particulates, in water, well adapted for detergency applications, have a pumpable low viscosity and include an effective viscosity reducing amount of a siliconate and/or a siliconate derivative and, advantageously, a suspension stabilizer, e.g., an alkaline earth metal cation or a biogum polysaccharide.

23 Claims, No Drawings

STABLE PUMPABLE ZEOLITE/SILICONATE SUSPENSIONS

CROSS-REFERENCE TO COMPANION APPLICATIONS

This application is a divisional of application Ser. No. 08/000,573, filed Jan 4, 1993, now U.S. Pat. No. 5,401,432 which is a continuation of application Ser. No. 07/593,961, filed Oct. 9, 1990, now abandoned.

Copending applications Ser. No. 594,561 filed Oct. 10, 1990, now U.S. Pat. No. 5,104,566 and Ser. No. 594,558 filed Oct. 9, 1990, now U.S. Pat. No. 5,064,562, both filed concurrently herewith and both assigned to the assigned hereof.

BACKGROUND OF THE INVENTION

1. Field of the Invention

The present invention relates to novel zeolite/siliconate suspensions and to the use of such novel suspensions for detergency applications.

2. Description of the Prior Art

The use of zeolites in detergent compositions is well known to this art. Thus, the zeolites have at least partially replaced the phosphates in detergents. Indeed, the phosphates are believed to be responsible for the eutrophication of water supplies and thus of presenting ecological and environmental difficulties.

However, the known zeolite suspensions present many disadvantages in industrial handling because of their very unusual rheological behavior.

Indeed, these suspensions tend to expand. Their viscosity is very high; they are, therefore, difficult to pump, which makes their use, for example their incorporation into detergent slurries, which may be sprayable, difficult, if not impossible. Moreover, these suspensions also have a tendency to sediment or to gel, which makes them difficult to transport or store.

SUMMARY OF THE INVENTION

Accordingly, a major object of the present invention is the provision of novel aqueous zeolite suspensions having low viscosity, which novel suspensions are particularly pumpable and which otherwise conspicuously ameliorate those disadvantages and drawbacks to date characterizing the state of this art.

Another object of the present invention is the provision of novel zeolite suspensions that are stable over time and in storage.

Briefly, the present invention features novel suspensions of the zeolites, in water, such novel zeolite suspensions also comprising a siliconate and/or a siliconate derivative.

DETAILED DESCRIPTION OF THE PREFERRED EMBODIMENTS OF THE INVENTION

More particularly according to the present invention, in a preferred embodiment thereof, the subject zeolite suspensions also contain at least one stabilizer.

The effect of the incorporation of the siliconate and/or the siliconate derivative is to lower the viscosity of the zeolite suspensions considerably. It also enables suspensions to be produced that are easily handled and which have a higher solids content, for example of at least 55%. Finally, it too has been determined that the siliconates or siliconate derivatives do not adversely affect the exchange capacity of the zeolites.

Suitable zeolites for the formulation of the suspensions of the present invention comprise the naturally occurring or synthetic crystalline, amorphous and mixed crystalline/amorphous zeolites.

Of course, those capable of reacting sufficiently rapidly with calcium and/or magnesium ions such as to soften washing waters are the preferred.

Typically, finely divided zeolites are used which have an average primary particle diameter ranging from 0.1 to 10 μm and advantageously from 0.5 to 5 μm, as well as a theoretical cation exchange capacity in excess of 100 mg of $CaCO_3$/g of anhydrous product and preferably of more than 200 mg.

The zeolites of the A, X or Y type, and in particular 4A and 13X, are the preferred.

The products described in French Patent Applications Nos. 2,225,568, 2,269,575 and 2,283,220, hereby expressly incorporated by reference, are exemplary zeolites that can be used to formulate the novel suspensions of the present invention.

The zeolites prepared by the processes described in French Patent Applications Nos. 2,376,074, 2,384,716, 2,392,932 and 2,528,722, assigned to the assignee hereof and hereby also expressly incorporated by reference, are particularly preferred. The '722 application in particular describes zeolites having a rate constant, related to the surface area of the zeolites per liter of solution, of more than $0.15\ s^{-1}.1.m^{-2}$, preferably more than 0.25 and which advantageously ranges from 0.4 to $4\ s^{-1}.1.m^{-2}$. These zeolites have particularly desirable properties in detergency applications.

The aforenoted '932 application, in particular, describes zeolites prepared by a process entailing injecting an aqueous solution of sodium silicate into the axis of a venturi, while an aqueous solution of sodium aluminate is injected coaxially into the same venturi, with recycling of the resulting mixture.

In particular, zeolites of the formula:

$$x\ Na_2O,\ y\ Al_2O_3,\ zSiO_2,\ wH_2O$$

are produced in which if y=1, x=1, z=1.8 to 2 and w=0 to 5 and which have a particle size distribution corresponding to the following numerical distribution: 95% <10 μm, 99% <15 μm, 50% ranging from 2 to 6 μm in average diameter.

The suspensions can have a variable zeolite concentration, depending on the intended application thereof. For detergency applications, this concentration typically ranges from 40% to 51%.

The pH of the suspensions also depends on the intended application thereof. Also for detergency applications, this pH, expressed at 1% by weight of dry zeolite, is about 11.

According to the primary characteristic of the present invention, a siliconate and/or a siliconate derivative dispersing agent is incorporated into the suspensions described above.

The siliconates are compounds well known to this art and include the salts of siliconic acid or derivatives thereof.

Particularly representative siliconates are those having the formula (I):

$$R\text{—}Si\ (OM)_m\ (OH)_{3-m} \qquad (I)$$

and/or the condensation products thereof, in which formula R is a hydrocarbon radical advantageously having from 1 to 18 carbon atoms or a substituted such hydrocarbon radical bearing a halogen atom or an amino, ether, ester, epoxy, mercapto, cyano or (poly)glycol group; m is an integer or fraction ranging from 0.1 to 3; and M is an alkali metal or an ammonium or phosphonium group.

Preferably, R is a hydrocarbon radical having from 1 to 10 carbon atoms and more preferably from 1 to 6 atoms.

In particular, R can be an alkyl radical, for example methyl, ethyl, propyl, butyl or isobutyl; an alkenyl radical, such as, for example, vinyl; an aryl radical, for example phenyl or naphthyl; an arylalkyl radical, such as, for example, benzyl or phenethyl; an alkylaryl radical, such as, for example, tolyl or xylyl; or an araryl radical, such as biphenylyl.

Exemplary of M, sodium or potassium are particularly representative, as are the groups $N^+R'_4$ and $P^+R'_4$ in which the radicals R', which may be identical or different, are each a hydrocarbon radical having from 1 to 6 carbon atoms.

The alkali metal siliconates are more preferably used. It is also possible to use the alkaline earth metal siliconates.

Similarly, the alkylsiliconates and especially the alkali metal alkylsiliconates such as, for example, the sodium or potassium methylsiliconates, are also preferred.

It is also possible to use the siliconates of formula (I) in which R is a vinyl or phenyl radical, and more particularly the alkali metal siliconates thereof.

It will be appreciated that the alkali metal or alkaline earth metal siliconates are compounds that are available commercially.

They can be prepared, for example, by hydrolysis of the corresponding silanes having 3 hydrolyzable groups such as halogen atoms or alkoxy radicals, followed by a dissolution of the resulting product in a solution of a strong inorganic base, in proportions such that there is at least one equivalent of base per silicon atom (see, for example, U.S. Pat. Nos. 2,441,422 and 2,441,423).

Exemplary siliconates of this type which are available commercially are, in particular, RHODORSIL® SILICONATE 51T, marketed by the assignee hereof, which is a potassium methylsiliconate.

As indicated above, the dispersing agent can also be a derivative of a siliconate.

By "derivative(s)" are intended the condensation products of compounds corresponding in particular to the above formula (I), or those resulting from the at least partial polymerization of such compounds into silicon compounds or polymers.

It is known to the art, for example, that the alkali metal alkylsiliconates can be converted into polyalkylsiloxanes, in particular by the action of carbon dioxide or another acidifying agent.

It will of course also be appreciated that it is possible to use two or more siliconates or derivatives thereof in combination in the suspension.

The siliconates are typically used in the form of aqueous solutions.

The amount of siliconate incorporated is a function of the specific surface area of the zeolite. Such amount typically ranges from 0.01 to 2%, more preferably from 0.05 to 0.3% by weight relative to the weight of the suspension. This amount applies for a 50% solution of the siliconate or siliconate derivative, in water.

As indicated above, the effect of incorporation of the siliconates is to render the zeolite suspensions pumpable and handleable by reason of their low viscosity.

However, the final product suspensions are also stable, namely, they do not settle or settle to only a slight extent. In this case, these suspensions can be transported or stored without difficulty.

In a preferred embodiment of the invention, the suspensions contain a stabilizer in addition to the siliconate.

Thus, an alkaline earth metal cation is a representative stabilizer according to the present invention. Compare FR-A-2,568,790 in this respect, assigned to the assignee hereof and hereby expressly incorporated by reference.

The cation preferably used is magnesium.

The cation may, however, be supplied in the form of a halide, in particular of a chloride. More particularly, magnesium chloride, for example magnesium chloride hexahydrate, is used.

The amount of cation employed typically ranges from 0.002 to 0.5% by weight relative to the weight of the suspension.

Naturally occurring polysaccharides of animal origin, such as chitosan and chitin; of vegetable origin, such as carragenenans, alginates, gum arabic, guar gum, carob gum, tara gum, cassia gum and konjak mannan gum, and finally those of bacterial origin or biogums, are exemplary of other types of stabilizers which may be used according to this invention.

The biogums are polysaccharides having high molecular weights, generally of more than one million, produced by fermentation of a carbohydrate under the action of a microorganism.

The following are particularly representative biogums which can be included in the suspensions of the present invention: xanthan gum, i.e., that produced by fermentation using bacteria or fungi belonging to the genus *Xanthomonas*, such as *Xanthomonas begoniae, Xanthomonas campestris, Xanthomonas carotae, Xanthomonas hederae, Xanthomonas incanae, Xanthomonas malvacearum, Xanthomonas papavericola, Xanthomonas phaseoli, Xanthomonas pisi, Xanthomonas vasculorum, Xanthomonas vesicatoria, Xanthomonas vitians* and *Xanthomonas pelargonii.*

The xanthan gums are currently available commercially.

One example of a product of this type is that marketed under the trademark RHODOPOL by the assignee hereof.

Other gums which are exemplary are gellan gum produced from *Pseudomonas elodea*, and Rhamsan and Welan gums produced from Alcaligenes.

Synthetic or chemically modified gums containing cellulose can also be used.

Thus, the macromolecular polyholosides can be used, in particular cellulose and starch, or derivatives thereof. Exemplary thereof are carboxymethylcellulose, methylcellulose, ethylcellulose, hydroxymethylcellulose, cyanoethyl starch and carboxymethyl starch.

The stabilizers described above (polysaccharides, biogums and modified gums) are used in solid form, as a powder or as an aqueous solution.

They are advantageously incorporated in an amount ranging from 0.001 to 2% and more particularly from 0.01 to 0.5% by weight relative to the weight of the suspension.

Carboxylic acids and their salts, and in particular acetic, formic, oxalic, malic, citric and tartaric acids, are representative of other types of stabilizers.

Alkali metal salts, such as $NaHCO_3$, NaCl, $Na_2CO_3$, $Na_2SO_4$ and sodium pyrophosphate or sodium tripolyphosphate, are also representative.

For these two types of stabilizers, amounts of 0.05 to 10% are used, expressed as percentage by weight relative to the weight of the suspension.

Water-soluble acrylic acid polymers crosslinked with a sucrose polyallyl ether, for example in a proportion of about 1% and having an average of about 5.8 allyl groups per sucrose molecule, the polymers having a molecular weight of more than 1,000,000, may also be used. The polymers of this type comprise the Carbopol series, for example Carbopol 934, 940 and 941.

For this latter type of stabilizer, the amounts used, expressed as percentage by weight relative to the suspension, range from 0.001 to 2%.

It will of course be appreciated that the stabilizers indicated above can be used alone or in combination.

The preparation of the zeolite suspensions according to the invention is carried out in a simple manner by introducing the additives described above into the suspension and mixing.

If necessary, the pH of the suspensions can be adjusted to the desired value in known manner by adding any suitable neutralizing agent.

The suspensions containing the zeolites and stabilized by the systems described above are useful in numerous applications.

They can be used in the form of suspensions essentially based on zeolites and the stabilizing additives described above. In this case, they can be used in the preparation of detergent compositions. They can also be used in any field other than detergency in which zeolites are currently employed, for example in papermaking.

The present invention also features novel detergent compositions, in particular liquid detergents, which in addition to the suspensions based on zeolites and the stabilizers, also contain all of the other additives typically included in detergency applications, such as bleaching agents, foam-control agents, anti-soil agents, perfumes, colorants and enzymes.

In order to further illustrate the present invention and the advantages thereof, the following specific examples are given, it being understood that same are intended only as illustrative and in nowise limitative.

EXAMPLES

In these Examples, the suspensions were formulated as described above and the immediately following definitions and processing parameters were employed:

The solids content of the suspension is reported in % by weight of anhydrous zeolite determined by measuring the weight loss on heating at 850° C. for one hour.

The pH indicated is reported for an aqueous dispersion containing 1% of dry zeolite and it is measured using a high alkalinity pH electrode.

The exchange capacity is reported as the amount of calcium (expressed as mg of $CaCO_3$) exchanged by 1 g of anhydrous zeolite at 25° C. The measurement was carried out in the following manner: 0.4 g of zeolite (expressed as anhydrous zeolite) was introduced into a $5\times10^{-3}$ mol/1 solution of $CaCl_2$. The mixture was stirred for 15 minutes. After filtering, the excess calcium was determined at pH 10 by back titration against EDTA in the presence of a colored indicator, Eriochrome Black T.

It should be appreciated that the stabilizer/dispersing agent system of the invention did not disturb or alter this capacity.

With regard to the rheology, the rheometer used was a RHEOMAT 30 fitted with a centered B measurement system. The measurement entailed conducting a velocity gradient cycle (ascending and descending). The range of velocity gradient investigated ranged from 0.0215 to 157.9 $s^{-1}$, which corresponded to speeds of rotation of the moving body of 0.0476 to 350 revolutions per minute. The viscosities recorded below correspond to the measurements obtained during the descent of the velocity gradient.

The sedimentation was determined by introducing the zeolite suspension into 50 or 100 cc graduated cylinders. The volumes of supernatant and settled material were measured every five days. The cylinders were maintained at ambient temperature (20° C.) or placed in a thermostat-controlled chamber.

The zeolite used was a 4A zeolite having an average diameter of the primary particles of 3.5 μm.

EXAMPLES 1 to 4

The results obtained are reported in Table I below:

TABLE I

| Example | 1 (Comparative) | 2 (Comparative) | 3 (According to the invention) | 4 (According to the invention |
|---|---|---|---|---|
| Suspension, % of anhydrous zeolite | 47.3 | 47.5 | 47.2 | 47.6 |
| Exchange capacity | 303 | 303 | 303 | 303 |
| Siliconate % in suspension | 0 | 0 | 0.17 | 0.08 |
| pH | 10.88 | 11.07 | 10.87 | 11.06 |
| Viscosity (in poise) at 5 $s^{-1}$ | 12.5 | 27.4 | 0.17 | 6.5 |

The siliconate used was the product marketed under the trademark RHODORSIL SILICONATE 51T by the assignee hereof, having the formula $CH_3Si(OK)_3$.

EXAMPLES 5 to 7

These examples relate to the use of magnesium cations as stabilizers, in addition to the siliconate. The siliconate was the same as that used in the preceding examples.

The results obtained are reported in Table II below.

Although the presence of a stabilizer increased the viscosity of the suspension, this viscosity still remained very low.

TABLE II

| Example | 5 | 6 | 7 |
|---|---|---|---|
| Suspension, % of anhydrous zeolite | 47.7 | 47.6 | 47.2 |
| Exchange capacity mg$CaCO_3$/g zeolite | 302 | 302 | 302 |
| % Siliconate in suspension | 0.2 | 0.2 | 0.2 |
| $MgCl_2.6H_2O$ % | 0.3 | 0 | 0 |
| Mg silicate % | 0 | 0.2 | 0 |
| pH | 10.96 | 10.96 | 10.87 |
| Viscosity, poise, at 4.74 $s^{-1}$ | 1.2 | 0.3 | 0.17 |
| Sedimentation, supernatant (% by volume) volume | 10 at the end of 5 days | 22 at the end of 5 days | 15 at the end of 48 hours |

EXAMPLES 8 to 11

Examples 8 and 9 relate to the use of xanthan gum as a stabilizer. The same siliconate as above was used. The results are reported in Table III. The amount of xanthan gum used was 0.12% and 0.1% by weight relative to the weight of the suspension in Examples 8 and 9, respectively.

Example 10 relates to the use of oxalic acid as the stabilizer. This was used in an amount of 1% by weight relative to the suspension. The siliconate was the same as in Examples 8 and 9.

Example 11 relates to the use of Carbopol 941 as the stabilizer, in an amount of 0.1% by weight relative to the suspension.

TABLE III

| Examples | 8 | 9 | 10 | 11 |
|---|---|---|---|---|
| Suspension, % of anhydrous zeolite | 47.5 | 49.3 | 49.3 | 49.7 |
| Exchange capacity | 288 | 288 | 288 | |
| Siliconate (% in suspension) | 0.17 | 0.2 | 0.1 | 0.1 |
| pH | 10.86 | 11.46 | 11.03 | 10.66 |
| Viscosity in poise at 5 $s^{-1}$ | 10.2 | 10.2 | 6.5 | 3.1 |
| Supernatant (% by volume) | | | | |
| 5 days | 3 | 1.5 | 2 | 2 |
| 10 days | 4 | 2 | 7 | |
| Settled material % | | | | |
| 5 days | <0.5 | <<1 | 0 | 1 |
| 10 days | 0.5 | 1 | <<1 | |

EXAMPLE 12 (COMPARATIVE

A suspension of the same zeolite as in the preceding examples was used, in a concentration of 49.7% and without any additive. The pH was 11.57. A viscosity at 5 $s^{-1}$ of 59 poises was then measured. At the end of 5 days, there was 3.5% of supernatant and 60% of settled material.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A stable zeolite suspension, in water, said zeolite suspension having a pumpable low viscosity and comprising a zeolite and an effective viscosity reducing amount of a siliconate, a siliconate derivative or mixtures thereof, wherein said siliconate, siliconate derivative or mixture thereof has the formula (I):

$$R{-}Si(OM)_m(OH)_{3-m} \quad (I),$$

a condensation product thereof or mixtures thereof, in which R is a non-substituted hydrocarbon radical having from 1 to 18 carbon atoms; m is an integer or fraction ranging from 0.1 to 3; and M is an alkali metal or an ammonium or phosphonium group.

2. The stable zeolite suspension as defined by claim 1, having a solids content of at least 55% by weight.

3. The stable zeolite suspension as defined by claim 1, said zeolite particulates having an average primary particle diameter ranging from 0.1 to 10 μm.

4. The stable zeolite suspension as defined by claim 1, said zeolite particulates having an average primary particle diameter ranging from 0.5 to 5 μm.

5. The stable zeolite suspension as defined by claim 1, comprising zeolite A, X or Y particulates.

6. The stable zeolite suspension as defined by claim 5, comprising zeolite 4A or 13X particulates.

7. The stable zeolite suspension as defined by claim 1, having a zeolite concentration ranging from 40 to 51%.

8. The stable zeolite suspension as defined by claim 1, having a pH, expressed at 1% by weight of dry zeolite, of about 11.

9. The stable zeolite suspension as defined by claim 1, wherein formula (I), R is an alkyl radical.

10. The stable zeolite suspension as defined by claim 1, wherein formula (I), R is phenyl or vinyl.

11. The stable zeolite suspension as defined by claim 1, said siliconate and/or siliconate derivative comprising an alkali or alkaline earth metal siliconate.

12. The stable zeolite suspension as defined by claim 11, said siliconate and/or siliconate derivative comprising an alkylsiliconate.

13. The stable zeolite suspension as defined by claim 1, comprising from 0.05 to 0.3% by weight of said siliconate and/or siliconate derivative.

14. The stable zeolite suspension as defined by claim 1, further comprising a suspension-stabilizing amount of at least one stabilizer.

15. The stable zeolite suspension as defined by claim 14, said at least one stabilizer comprising an alkaline earth metal cation.

16. The stable zeolite suspension as defined by claim 15, said alkaline earth metal cation comprising magnesium.

17. The stable zeolite suspension as defined by claim 14, said at least one stabilizer comprising a polysaccharide.

18. The stable zeolite suspension as defined by claim 17, said polysaccharide comprising a biogum.

19. The stable zeolite suspension as defined by claim 18, said biogum comprising a xanthan gum.

20. The stable zeolite suspension as defined by claim 14, said at least one stabilizer comprising cellulose, starch or derivative thereof.

21. The stable zeolite suspension as defined by claim 14, said at least one stabilizer comprising a carboxylic acid or salt thereof, or an alkali metal salt.

22. The stable zeolite suspension as defined by claim 14, said at least one stabilizer comprising a cross-linked acrylic acid polymer.

23. A detergent composition comprising the stable zeolite suspension as defined by claim 1.

* * * * *